L. DOW,

Assignor to AMERICAN IRON POST AND CONSTRUCTION COMPANY.

WIRE FENCE.

No. 10,362. Reissued Aug. 7, 1883.

Witnesses:
John A. Ellis.
Walter M. Wolfe.

Inventor:
Lorenzo Dow
By David A. Burr
Attorney.

UNITED STATES PATENT OFFICE.

LORENZO DOW, OF BOSTON, MASSACHUSETTS, ASSIGNOR TO AMERICAN IRON POST AND CONSTRUCTION COMPANY, OF NEW YORK.

WIRE FENCE.

SPECIFICATION forming part of Reissued Letters Patent No. 10,362, dated August 7, 1883.

Original No. 247,893, dated October 4, 1881. Application for reissue filed March 16, 1883.

*To all whom it may concern:*

Be it known that I, LORENZO DOW, a resident of Boston, in the State of Massachusetts, and formerly of Denver, Colorado, have invented a new and useful Improvement in Wire-Fence Posts; and I do hereby declare that the following is a full and exact description thereof, reference being had to the accompanying drawings, and to the letters of reference marked thereon, making a part of this specification.

The object of my invention is to obtain a sheet-metal post for wire fences which shall embody the requisite strength with the least weight of metal, and shall combine with the strength durability, facility of setting, and convenience in attaching and removing the wire found in the best forms of metallic posts, not only an economy of material and a consequent substantial reduction in cost, but also an elastic action by which the wires are automatically kept taut to brace the posts and strengthen the whole line of fence.

It consists in a fence-post made of thin wrought or sheet iron shaped into a partly tubular and longitudinally-tapering form, with its two edges bent toward each other. By bending the metal into a shape whose cross-section embraces an arc exceeding one hundred and eighty degrees the tendency which is inevitable in a U-shaped or strictly semi-tubular form of the longitudinal edges to spread apart, buckle, and break when subjected to a bending or torsional strain is avoided, and the strength of a tubular form in resisting such a strain is measurably retained, while a reduction in weight and an elasticity in a transverse direction is obtained by reason of the open space left between the edges.

My improved post thus constructed furnishes an article for general use which is comparatively inexpensive, is lighter and more convenient than wooden posts, and cheaper, when cost of setting is included, remains securely fixed in the ground when once properly set, and is far stronger in proportion to its weight and cost than any other [illegible]n of iron post yet produced, the iron posts of proper strength heretofore put upon the market being so expensive as to preclude their general use as a substitute for wood.

Figure 1:
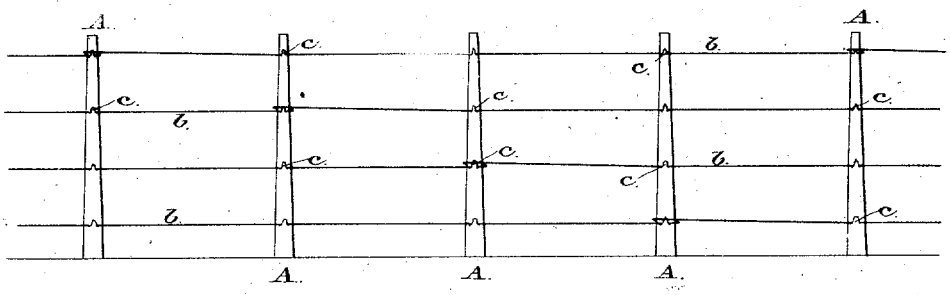
Figure 2:
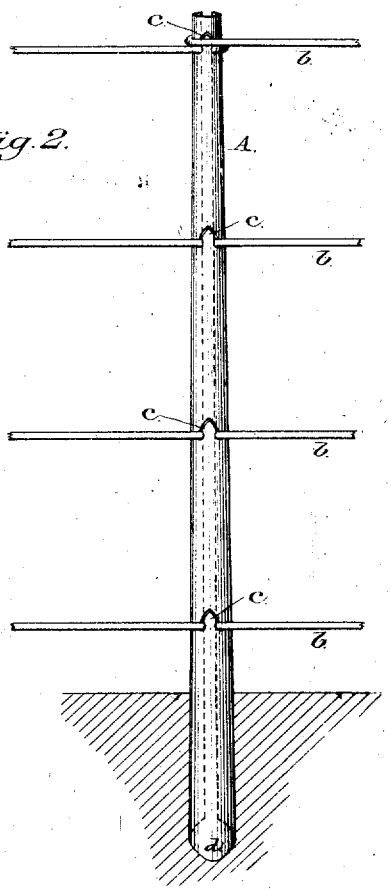

In the accompanying drawings, Figure 1 represents a section of fence constructed with my improved posts. Fig. 2 is an elevation, in larger size, of one of the posts with wires attached, and Fig. 3 is a horizontal section of the post.

Figure 3:
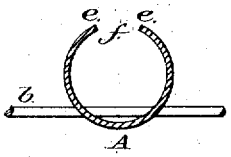

The posts A are constructed of strips of sheet metal, shaped into a longitudinally-tapering and partly tubular form, so that the arc of its cross-section shall exceed one hundred and eighty degrees, as illustrated in Fig. 3 of the drawings. The post thus consists in effect of a hollow longitudinally-slotted open tapering tube elastic in cross-section, and whose larger end constitutes its base, at shown in Fig. 2. The bend or curve of the edges of the hollow open post, to include an arc embracing more than a semicircle, is preferably maintained throughout the entire length of the post.

By projecting the edges *c c* of the bent strip toward each other, as described, in the form of an arc extending beyond the limits of a semicircle, these edges are brought into such relation to the body of the strip as to resist to the best advantage any longitudinal or torsional strain tending to flexion thereof in either direction, while in the economy of material obtained by dispensing with the metal in the longitudinal slot left between said edges, and by gradually reducing the diameter of the post from its base upward, greatly diminishes its weight, without, however, sacrificing its strength. The open space left between the edges is of importance not only as a matter of economy of material, but to secure the desired transverse elasticity of the post. Tongues or hooks *e*, produced by making a V-shaped cut in the metal while in its flat form, are formed on the side of the post opposite its longitudinal opening, and at the base of each tongue the metal is removed sufficiently to give space for the wires *b*. This construction of the hook is simple and convenient. The wire is supported and retained in place, yet left free to slip lengthwise.

These posts are to be set directly into the ground, and, where the soil is not too hard and stony, can be driven. To facilitate driving the lower ends are formed beveling, so that the solid side extends as a point or cutter, *d*, which will readily penetrate the soil.

The posts may be galvanized or covered with asphaltum, and thus be rendered practically indestructible.

In building fences with these posts the posts are first set and the wires then strung by turning out the tongues *c*, putting the wires in place, and then bending the tongue back. On each post one of the wires is given a turn around the post, so that each wire, when four are used, is attached to every fourth post, as illustrated in Fig. 1. The wires are thus put under tension, their contraction is allowed, and any slack resulting from expansion is taken up by the elasticity of the posts.

I am aware that metallic posts have been made in strictly a semi-tubular form, and also to approximate the shape of the letter U, with sides flaring outward; also, that cylindrical tubes of sheet metal have been used for fence-posts.

My invention is designed as an improvement upon said forms of metal posts; and

I claim as my invention—

1. An open longitudinally-tapering sheet-metal post elastic in cross-section, and whose sides, bent and curved toward each other, describe an arc exceeding one hundred and eighty degrees, substantially in the manner and for the purpose herein set forth.

2. In wire fences, tubular sheet-metal posts open longitudinally to give elasticity, in combination with wire rails *b*, of which one is wrapped about each post, as and for the purpose specified.

In testimony whereof I have signed my name to this specification in the presence of two subscribing witnesses.

LORENZO DOW.

Witnesses:
WALTER M. WOLFE,
JOHN A. ELLIS.